Feb. 2, 1926.
J. M. DAYTON
HEAVY DUTY COUNTER
Filed August 6, 1925
1,571,576
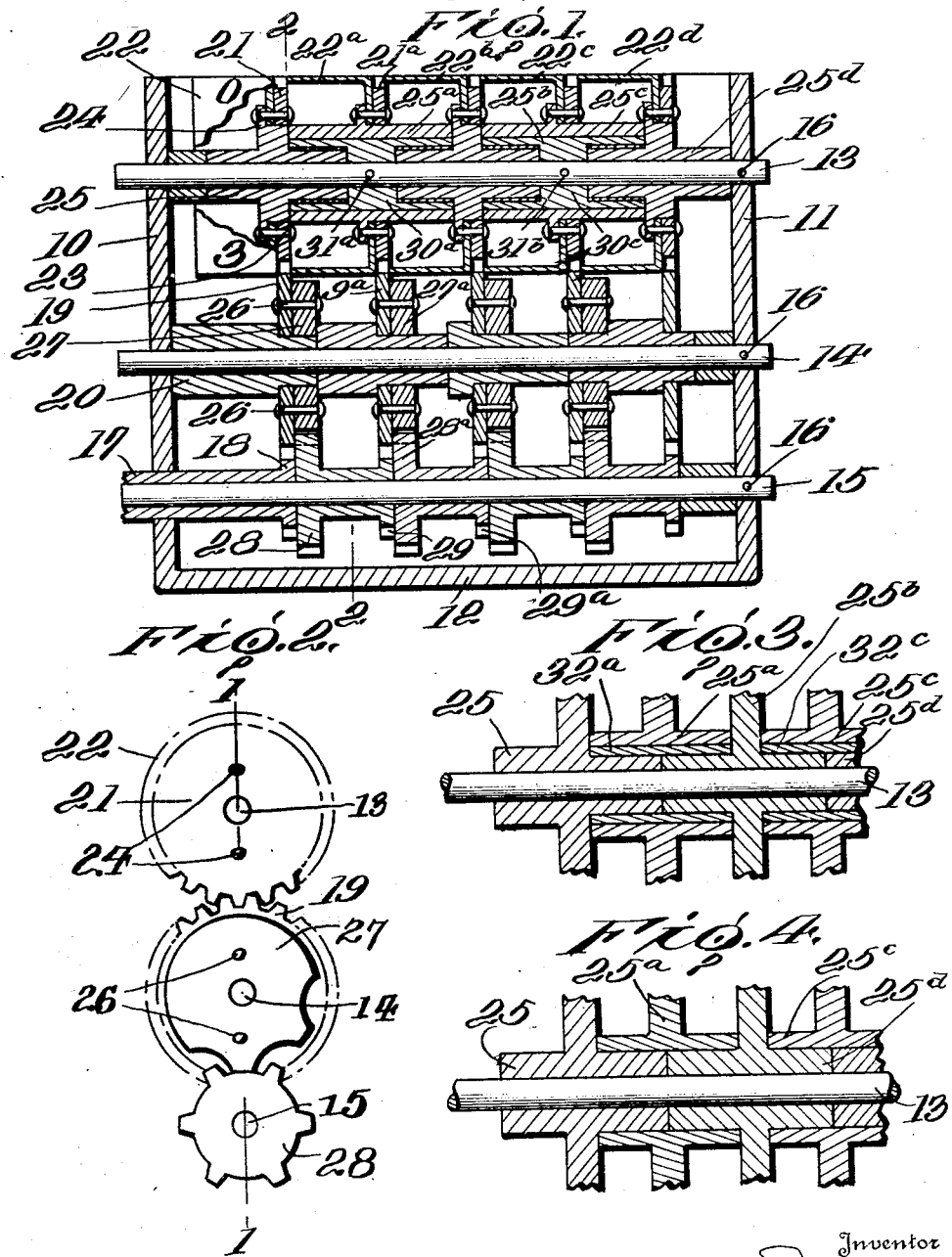
Inventor
James M. Dayton
By Sturtevant & Mason
Attorneys Patented Feb. 2, 1926.

1,571,576

UNITED STATES PATENT OFFICE.

JAMES M. DAYTON, OF HARTFORD, CONNECTICUT, ASSIGNOR TO DAYTON MANUFACTURING COMPANY, OF TORRINGTON, CONNECTICUT, A CORPORATION OF CONNECTICUT.

HEAVY-DUTY COUNTER.

Application filed August 6, 1925. Serial No. 48,600.

*To all whom it may concern:*

Be it known that I, JAMES M. DAYTON, a citizen of the United States, residing at Hartford, in the county of Hartford, State of Connecticut, have invented certain new and useful Improvements in Heavy-Duty Counters, of which the following is a description, reference being had to the accompanying drawing and to the figures of reference marked thereon.

This invention relates to improvements in counters or totalizing devices.

Counters employed on machinery are subjected to vibration and shocks, and heretofore the bearings for the number wheel and transfer pinions have worn away rapidly because of these conditions and the high rate of speed at which the counter may be operating. The number-wheel and transfer elements were formed as identical units; and the length of the bearing was determined by the distance from one edge of a number-wheel to the corresponding edge of an adjacent number-wheel. If it were sought to employ longer bearings, the number wheels were spaced at a greater distance, and the total width across their faces made it difficult to obtain a quick reading, and furthermore the bulk of the device was much increased in an undesirable direction. Also, a certain width must be allotted for the transfer pinion gear teeth to carry the load imposed upon them, which also led to the use of widely spaced number-wheels.

The present invention provides a heavy duty counter which has elongated bearings for the number wheels, and in which the number wheels and transfer mechanism are dissociated from each other so that thin gears may be employed in connection with the number-wheels and the several number-wheels placed close together along their axis.

With these and further objects in view the invention has been illustrated on the accompanying drawings in which, Fig. 1 is an axial section on line 1—1 of Fig. 2 and shows the rear of a counter assembly employing five number-wheels.

Fig. 2 is a corresponding section on line 2—2 of Fig. 1.

Figs. 3 and 4 show modified forms of the bearings for the number-wheels.

In these drawings the counter comprises a U-shaped frame having the standards 10 and 11 and the bottom connecting strap 12. Mounted in these standards 10 and 11, are the three shafts 13, 14, 15 which are pinned to the standard 11 as shown at 16 so that they are fixed in regard thereto and are secured against longitudinal movement. Of these shafts, that at 13 will be hereafter referred to as the "indicator shaft", that at 14 as the "intermediate shaft" and that at 15 as the "operating shaft."

A driving shaft 17 is mounted coaxially with the operating shaft 15 and carries at its inner end a gear wheel 18. This gear wheel is adapted to drive the fifty-tooth wheel 19 which is journalled on a sleeve 20 mounted on the intermediate shaft 14. A similar gear 21 of fifty teeth is journalled relatively to the indicator shaft 13 and meshes with the gear 19. The first or "tenths" number-wheel 22 is of cupped shape and of substantially the same diameter as the gear 21. The gear 21 and number-wheel 22 are pinned together by small rivets 23 which likewise pass through the flange 24 of a journal sleeve 25: the assembly of the gear, number-wheel and sleeve turns as a unit. It will be understood that when this counter is applied for example to an automobile as a part of the speedometer assembly that the driving shaft 17 will be rotated at such a speed relative to the progression of the vehicle that the number-wheel 22 will make one revolution per mile and that at every tenth of a revolution corresponding to every tenth of a mile, it will present a corresponding digit opposite the window in the speedometer face plate. Since the gear 21 and the number-wheel 22 are of the same diameter, the number-wheel may be mounted flush with the surface of the speedometer dial.

Likewise journalled on the sleeve 20 and attached to the gear 19 by the rivets 26 is a two-tooth mutilated gear 27 which has its teeth of such form that it serves as one element of a Geneva movement in cooperation with a six tooth Geneva gear 28 which is journalled on the operating shaft 15. This gear 28 is formed integrally with or positively connected to a gear 29 having fifteen teeth. The gear 28 thus makes one-third of a revolution for each revolution of the corresponding Geneva plate 27. The gear 29 serves as the driving element for the gear 19ª and thereby drives the gear 21ª which is riveted to the "units" number-wheel 22ª and to a bearing sleeve 25ª.

Similar to gear 19, the gear 19ª is riveted to a two-tooth Geneva plate gear 27ª and thereby drives the six-tooth Geneva plate gear 28ª, which in turn drives the fifteen-tooth gear 29ª.

A similar train exists for each of the remaining decimal number-wheels 22ᵇ, 22ᶜ, 22ᵈ, and is connected and operates in a similar manner and need not be described in further detail.

The sleeves 25, 25ᵇ, 25ᵈ, are journalled upon the shaft 13 and move freely with regard thereto. Spaced between these several sleeves are the bearing bushings 30ª and 30ᶜ, which have cavities at each end to receive the reduced ends of the sleeves 25, 25ᵇ, 25ᵈ, which rotate freely within them preferably with an annular clearance. The sleeves 25ª and 25ᶜ are journalled about the exterior of the bushings 30 and 30ᶜ and rotate freely thereon. It will be noted that this type of assembly gives the bearing sleeves a length approximately twice the thickness or width of an indicating wheel. Owing to the length of these bearings, there is less wear per unit of surface, since the driving effort is substantially uniform for any type of counter and an exact position of the number-wheels is procured and maintained for a long period of time.

In operation, the driving shaft 17 is rotated as described above and causes the number-wheel 22 to present its successive indications at the rate of one digit for each tenth of a mile traversed when for example the device is used for an automatic speedometer. Since the gears 19 and 21 have the same number of teeth, the two gears turn in unison. For every revolution of the number-wheel 22, the Geneva plate 27 makes one rotation and advances the gear 28 by two teeth. This corresponds to a movement of one-third of a revolution or five teeth of the gear 29. This gear 29 therefore advances the gear 19ª by five teeth or one-tenth of a revolution. Since the gears 19ª and 21 are of the same size, this results in a movement of the number-wheel 22ª from one digit to the next.

Since the gear trains are similar, a full revolution of the "units" number-wheel 22ª causes a one-tenth revolution of the "tens" number-wheel 22ᵇ, etc.

In the modified form of bearing shown in Fig. 3, the sleeves 25 and 25ᵇ are the same as before, except that they are supported upon the indicating shaft 13 in abutting relation. The sleeves 25ª and 25ᶜ in this form are supported upon the bushings 32ª and 32ᶜ, which rest immediately upon the reduced ends of the sleeves 25, 25ᵇ, 25ᵈ, without a central web upon the shaft 13.

In a modification of Fig. 4, the parts are as shown in Figs. 1 and 3 except that the sleeves 25ª and 25ᶜ are of smaller internal diameter and are supported immediately upon the sleeves 25, 25ᵈ, etc.

In each of Figs. 3 and 5, the operation is the same as before, and the number-wheels in every instance have a bearing approximately twice as long as the width of their respective faces.

The bearings in all forms are longer than the space allotted to a number-wheel. The alternate wheels are each attached to a bearing bushing which is mounted directly upon the shaft, while the interposed wheels are each attached to a bearing bushing which overlaps the cylindrical ends of the former bearing bushings, each of the bushings therefore laps past the adjacent bushings. Further, since the gears 19—21, 19ª—21ª, etc., have no greater load than that of rotating the relatively light number-wheels, they may be made much smaller than was possible when this gear train carried the power necessary for the transfer operation. On the other hand, by providing an intermediate shaft with transfer elements, the width of the gear faces is no longer restricted by the permissible spacing between the number-wheels.

It is obvious that the changes may be made in the shape, size and location of the various constituent parts within the scope of the appended claims.

I claim:

1. In a counter, an indicating shaft having a plurality of number-wheels journalled thereon, alternate wheels having bearing bushings of reduced outer diameter and the interposed number-wheels having bearing bushings of enlarged internal diameter, said enlarged bushings adapted to receive within them said reduced bushings, whereby the bearing for each number-wheel extends in each direction beyond the face of the wheel.

2. In a counter, a shaft, a plurality of wheels journaled about the axis of said shaft and bearing bushings attached to said wheels and supported concentrically with said shaft, some of said bushings overlapping each of the adjacent bushings.

3. In a counter, a shaft, a plurality of number wheels concentric with the axis of said shaft, a first plurality of bearing bushings having ends of reduced external diameter and intermediate flanges attached to alternate ones of said number-wheels to support the same, a second plurality of bearing bushings having ends of enlarged internal diameter and intermediate flanges attached to the other number-wheels to support the same, and bearing sleeves received within the enlarged diameters to journal the bushings of the said second plurality and of internal diameter to receive the reduced diameters of the bushings of said first plurality.

4. In a counter, a shaft, a plurality of wheels journaled about the axis of said shaft, and bearing bushings attached to said wheels and supported concentrically about the axis of said shaft, each of said bushings lapping past each of the adjacent bushings.

5. In a counter, a shaft, a plurality of wheels, a bearing bushing attached to each alternate one of said wheels and journaled upon said shaft and having cylindrical ends, a bearing sleeve receiving an end of each two neighboring bearing bushings, and a bearing bushing attached to each interposed one of said wheels and journalled upon one of said bearing sleeves.

6. In a counter, a shaft, a plurality of wheels, a bearing bushing attached to each alternate one of said wheels and journalled upon said shaft and having cylindrical ends, a bearing sleeve receiving an end of each two neighboring bearing bushings, and a bearing bushing attached to each interposed one of said wheels and journaled upon one of said bearing sleeves, each of said latter bearing bushings extending substantially the center distance between two number wheels to hold the assembly in spaced relation.

7. In a counter, a shaft, a plurality of wheels, a bearing bushing attached to each alternate one of said wheels and journaled upon said shaft and having cylindrical ends, a bearing sleeve mounted on said shaft between two neighboring bearing bushings and adapted to receive an end of each of the said neighboring bearing bushings, and a bearing bushing attached to each interposed one of said wheels and journaled upon one of said bearing sleeves.

8. In a counter, a plurality of wheels, and a plurality of bearing bushings to support said wheels and journalled about a common axis, alternates of said bushings being identical in shape inter se and lapping past each of the interposed bushings, said interposed bushings likewise being identical in shape inter se.

9. In a counter, a plurality of wheels, and a plurality of bearing bushings to support said wheels and journalled about a common axis, each of said bushings lapping past the adjacent bushing and terminating short of the next adjacent bushings, whereby any number of said bushings and wheels may be disposed in sequence.

10. In a counter, a plurality of wheels, and a plurality of bearing bushings to support said wheels and journalled about a common axis, each of said bushings serving as a journal bearing for the bushings adjacent to it at either side.

In testimony whereof, I affix my signature.

JAMES M. DAYTON.